United States Patent Office 3,382,291
Patented May 7, 1968

3,382,291
POLYMERIZATION OF OLEFINS WITH BF$_3$
James A. Brennan, Cherry Hill, N.J., assignor to Mobil Oil Corporation, a corporation of New York
No Drawing. Filed Apr. 23, 1965, Ser. No. 450,536
2 Claims. (Cl. 260—683.15)

ABSTRACT OF THE DISCLOSURE

In polymerizing a 1-olefin to an oily polymer, greater reproducibility is obtained by feeding to a reaction zone a stream (1) of a 1-olefin that is saturated with BF$_3$ and a stream (2) of BF$_3$ complexed in a 1:1 molar ratio with a promoter. BF$_3$ and BF$_3$ complex are the sole catalyst components. The process is particularly useful for producing synthetic lubricants.

---

This invention relates to olefin polymerization. It is more particularly concerned with a controllable process for polymerizing 1-olefins with boron trifluoride catalyst.

In United States Letters Patent No. 3,149,178, there are described poly-1-olefin synthetic lubricants. Depending upon the method of polymerization, thermal or catalytic with dialkyl peroxide or with a Friedel-Crafts catalyst, such as AlCl$_3$ and BF$_3$, a range of viscosities can be achieved.

In the particular case of BF$_3$, it has been found extremely difficult to control the reaction temperature and to avoid local overheating ("hot spots"). Consequently, reproducibility of the polymerization from run to run is poor. Various means have been proposed to solve the problems involved, but most proposals call for relatively elaborate equipment or involved manipulations, or both.

It has now been found that BF$_3$-catalyzed olefin polymerization can be carried out to give good reproducibility by a process that is relatively simple and economically feasible. It has been discovered that such results can be achieved by certain rather simple manipulative steps.

Accordingly, it is a broad object of this invention to provide an improved process for carrying out BF$_3$-catalyzed olefin polymerization. Another object is to provide a simple and economically feasible process for carrying out BF$_3$-catalyzed olefin polymerization. A specific object is to provide relatively simple, reproducible process for effecting BF$_3$-catalyzed olefin polymerization. Other objects and advantages of this invention will become apparent to those skilled in the art, from the following detailed description.

In general, this invention provides a reproducible process for polymerizing a 1-olefin to an oily liquid polymer that comprises feeding to a reaction zone a stream (1) of 1-olefin saturated with BF$_3$ and a stream (2) of BF$_3$ complexed in a 1:1 molar ratio with a promoter, and commingling said streams (1) and (2) in said reaction zone under polymerization reaction conditions.

In accordance with Patent No. 3,149,178, the improved synthetic lubricants are produced from 1-decene or from mixtures of 1-olefins having between about 6 and about 12 carbon atoms having a mean value of the olefin chain length of about 10 carbon atoms. The process technique of this invention, however, is not limited to the preferred olefins defined No. 3,149,178, but it is applicable to the polymerization of any polymerizable 1-olefin or mixtures thereof. Thus, the 1-olefin charge can be any normally liquid 1-olefin having between about 5 and about 20 carbon atoms or mixtures of such 1-olefins. Non-limiting examples of the 1-olefin charge are 1-pentene; 3-methyl-1-butene; 1-hexene; 3,3-dimethyl-1-butene; 2,3-dimethyl-1-butene; 1-heptene; 1-octene; 2,3,3-trimethyl-1-pentene; 2-ethyl-1-hexene; 1-decene; 1-undecene; 1-dodecene; 1-tetradecene; 1-hexadecene, 1-octadecene, and 1-eicosene.

The 1-olefin charge, i.e., a 1-olefin or mixture of 1-olefins, is saturated with BF$_3$ at room temperature (about 20° C.), before it is charged to the reaction zone. This can be accomplished by any means well known to those skilled in the art. Thus, the 1-olefin charge can be saturated by bubbling BF$_3$ gas through a 1-olefin batch, as in a storage vessel or it can be saturated by bubbling BF$_3$ gas through a 1-olefin charge stream as it passes en route to the reaction vessel. A convenient method for accomplishing the latter would be to use conventional gas scrubbing equipment for countercurrent contact of a gas with a liquid.

As is well known, BF$_3$ per se is a poor catalyst for polymerizing olefins, unless it is promoted with water or other substances capable of forming coordination compounds as noted hereinafter. Therefore, in order to accomplish the purpose of the process of this invention, the 1-olefin saturated with BF$_3$ should be free of water and other impurities.

The second stream that is charged to the reactor is a 1:1 molar complex of BF$_3$ and a promoter compound. This complex, upon contacting the first stream (1-olefin charge) in the reactor, effects the polymerization reaction. The promoter compound used to form BF$_3$-promoter catalyst complexes are well known in the art. They include, by way of non-limiting examples, water; alcohols, such as octanol and 1-decanol; acids, such as acetic acid, propionic acid, and butyric acid; ethers, such as diethyl ether; acid anhydrides such as acetic acid anhydride and succinic anhydride; esters, such as ethyl acetate and methyl propionate; and ketones and aldehydes, such as acetone and benzaldehyde.

As will be appreciated by those skilled in the art, the rate at which the streams (1) and (2) are charged to the reactor can vary widely, dependent in part upon the size of the reactor, but primarily upon the cooling capacity of the reactor. Thus, the rate of addition of the streams is limited only by the ability to remove exothermic heat of polymerization, so as to maintain a predetermined polymerization temperature.

An important feature of the process of this invention is that the rate of addition of stream (2) (BF$_3$-promoter) relative to the rate of addition of stream (1) (1-olefin saturated by BF$_3$) be adjusted to add only a catalytic amount and to avoid any excess over the catalytic amount. This rate is conveniently expressed in terms of moles of promoter per weight unit of olefin. This rate will be between about 0.006 mole promoter and about 0.01 mole promoter per 100 g. of 1-olefin charge. Using this relative rate of addition, a uniform rate of polymerization is attained and local overheating is avoided, thus permitting reproducibility of results from run to run.

The process of this invention is carried out using the usual conditions for $BF_3$-catalyzed polymerization of 1-olefins. The temperature is generally below about 60° C. and preferably between about 0° C. and about 35° C. The reaction can be carried out at atmospheric pressure, but moderate pressures of from about one p.s.i.g. up to about 500 p.s.i.g. are preferred.

In the usual batch operation, after addition of 1-olefin charge is completed, the reaction mixture is generally held at the reaction temperature for an additional period of time. This hold time will usually be between about 1 hour and about 3 hours, although higher hold times can be used. The process of this invention can also be carried out continuously by withdrawing a product stream at the rate of influent streams. After stable state reaction is reached, the average residence time will be equal to the aforedescribed hold time, thus affording a uniform product.

In the following examples, the techniques of the process of this invention are demonstrated, using the polymerization of 1-decene with $BF_3$-1-decanol as illustrative. It will be understood, however, that the method so demonstrated can be applied to other 1-olefins and promoters described hereinbefore, as those skilled in the art will readily appreciate.

Example 1

1-decene was pumped through the bottom of a water trap, saturated with $BF_3$ and allowed to overflow into the reaction flask. 1-decanol complexed with $BF_3$ in a mole ratio of 1 (promoter) was pumped directly into the reaction flask. The rates of these solutions were 23.8 ml./hr. and 0.29 ml./hr., respectively. These rates gave a promoter concentration of 0.008 mole per 100 g. of olefin. The reaction flask was pressured to 4 inches of mercury and maintained at 30° C. by means of circulating water. After complete addition of the charge, the reactor was held for one hour, at the above conditions, depressurized and swept with nitrogen. The product was neutralized with gaseous ammonia, heated at 80° C. for one hour ($N_2$), filtered, water washed until neutral, dried and finally distilled at reduced pressure.

The oligomers can be separated at the conditions shown below:

| Oligomer | T, ° C. | P., mm. |
|---|---|---|
| Monomer | 85-90 | 60 |
| Dimer | 120-140 | 0.5 |
| Trimer | 185-200 | 0.5 |
| Residual | >200 | 0.5 |

This run gave a 98% conversion to polymer and the following oligomer distribution:

| | Percent |
|---|---|
| Dimer | 10.6 |
| Trimer | 39.0 |
| Residual | 49.5 |

Examples 2 through 8

A series of runs were made to show the effect of process variables upon product distribution, using the technique described in Example 1. In each example, one variable was changed, keeping the others the same. In the table, pertinent data for each run are set forth, grouped in accordance with the variable studied.

Table.—The $BF_3$ Polymerization of 1-Decene.—Effect of Reaction Variables

| Example | Temp., ° C. | Pressure, in. Hg | Add. Rate, Percent/Min. | Hold Time, Hrs. | Promoter,[1] Moles/ 100 g. Olefin | G. Olefin | Percent Conversion | Oligomer Distribution, percent of Total | | | Olefin Trimer K.V. at −65° F. |
|---|---|---|---|---|---|---|---|---|---|---|---|
| | | | | | | | | Dimer | Trimer | Residual | |
| | | | | Temperature | | | | | | | |
| 2 | 25 | 4 | 1.90 | 1 | 0.008 | 150 | 92 | 13.1 | 37.9 | 49.0 | |
| 3 | 35 | 4 | 1.90 | 1 | 0.008 | 150 | 91.3 | 12.5 | 49.6 | 37.9 | 7,333 |
| | | | | Promoter Conc. | | | | | | | |
| 3 | 35 | 4 | 1.90 | 1 | 0.008 | 150 | 91.3 | 12.5 | 49.6 | 37.9 | 7,333 |
| 4 | 35 | 4 | 1.90 | 1 | 0.004 | 150 | <10 | 100 | | | 13,000 |
| 5 | 35 | 4 | 1.90 | 1 | 1.016 | 150 | 98 | 7.3 | 28.6 | 64.1 | |
| | | | | Add. Rate | | | | | | | |
| 6 | 35 | 0 | 1.90 | 1 | 1.008 | 150 | 81 | 15.1 | 55.6 | 29.4 | [2] >99,000 |
| 7 | 35 | 0 | 0.95 | 1 | 0.008 | 150 | 88 | 12.5 | 46.8 | 40.8 | 8,576 |
| | | | | Pressure | | | | | | | |
| 6 | 35 | 0 | 1.90 | 1 | 0.008 | 150 | 81 | 15.1 | 55.6 | 29.4 | [2] >99,000 |
| 3 | 35 | 4 | 1.90 | 1 | 0.008 | 150 | 91.3 | 12.5 | 49.6 | 37.9 | 7,333 |
| | | | | Hold Time | | | | | | | |
| 8 | 30 | 4 | 0.44 | 1 | 0.008 | 1,660 | 87.8 | 10.4 | 45.4 | 44.3 | |
| 8 | 30 | 4 | 0.44 | 2 | 0.008 | 1,660 | 89.9 | 10.3 | 44.6 | 45.1 | |
| 8 | 30 | 4 | 0.44 | 3 | 0.008 | 1,660 | 91.7 | 10.1 | 42.9 | 47.0 | |
| 8 | 30 | (?) | 0.44 | 19 | 0.008 | 1,660 | 95.0 | 8.8 | 38.2 | 53.0 | 7,655 |

[1] Promotor is 1-decanol.
[2] The high viscosity is attributed to contamination. Hydrogenation of this olefin resulted in a high quality fluid.

From the examples, it will be apparent that the process of this invention produces poly-1-decene in good yield and with desirable oligomer distribution, i.e., with a minimum formation of undesirable dimer (U.S. 3,149,178). Trimer and higher distribution can be varied by changing variables, but with each set of conditions results are reproducible. It will be noted that in the case of Example 4, low conversion only to dimer was achieved. In this run, however, the promoter concentration was below the range set forth hereinbefore.

It will be appreciated that the technique of this invention can be applied to other reactions catalyzed with $BF_3$. Thus, for example, alkylation of an aromatic hydrocarbon with an olefin can be effected by charging a stream of olefin and aromatic hydrocarbon saturated with $BF_3$ and a stream of 1:1 molar ratio $BF_3$-promoter complex, under alkylation reaction conditions.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A reproducible process for polymerizing a 1-olefin having between 5 and 20 carbon atoms to an oily liquid polymer that comprises feeding to a reaction zone a stream (1) of said 1-olefin saturated with $BF_3$ and a stream (2) of $BF_3$ complexed, in a 1:1 molar ratio, with a promoter, commingling said streams (1) and (2) in said reaction zone under polymerization reaction conditions, and controlling the relative rate of addition of streams (1) and (2) to charge between about 0.006 mole and about 0.01 mole promoter per 100 g. of 1-olefin;

said $BF_3$ and said $BF_3$ complexed with a promoter being the sole catalyst system.

2. A reproducible process for polymerizing 1-decene to an oily liquid poly-1-decene that comprises feeding to a reaction zone a stream (1) of said 1-decene saturated with $BF_3$ and a stream (2) of $BF_3$ complexed, in a 1:1 molar ratio, with 1-decanol, commingling said streams (1) and (2) in said reaction zone under polymerization reactions, and controlling the relative rate of addition of said streams (1) and (2) to charge between about 0.006 mole and about 0.01 mole 1-decanol per 100 g. of 1-decene.

References Cited

UNITED STATES PATENTS

| | | | |
|---|---|---|---|
| 2,603,666 | 7/1952 | Fritz | 260—683.15 |
| 2,766,312 | 10/1956 | Serniuk | 260—683.15 |
| 3,149,178 | 9/1964 | Hamilton et al. | 260—683.9 |

PAUL M. COUGHLAN, JR., *Primary Examiner.*

UNITED STATES PATENT OFFICE
CERTIFICATE OF CORRECTION

Patent No. 3,382,291        May 7, 1968

James A. Brennan

It is certified that error appears in the above identified patent and that said Letters Patent are hereby corrected as shown below:

Columns 3 and 4, in the Table, sixth column, line 7 thereof, "1.016" should read -- 0.016 --; same sixth column, line 9 thereof, "1.008" should read -- 0.008 --. Column 5, lines 8 and 9, "reactions" should read -- conditions --.

Signed and sealed this 7th day of October 1969.

(SEAL)
Attest:

Edward M. Fletcher, Jr.      WILLIAM E. SCHUYLER, JR.
Attesting Officer         Commissioner of Patents